(12) United States Patent
Thubert et al.

(10) Patent No.: US 10,757,714 B2
(45) Date of Patent: Aug. 25, 2020

(54) VERTICAL COLLISION AVOIDANCE IN LLNS

(71) Applicant: Cisco Technology, Inc., San Jose, CA (US)

(72) Inventors: Pascal Thubert, La Colle Sur Loup (FR); Huimin She, Shanghai (CN); Feiliang Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 15/962,035

(22) Filed: Apr. 25, 2018

(65) Prior Publication Data

US 2019/0335479 A1    Oct. 31, 2019

(51) Int. Cl.
| | |
|---|---|
| *H04W 72/12* | (2009.01) |
| *H04W 40/24* | (2009.01) |
| *H04B 1/713* | (2011.01) |

(52) U.S. Cl.
CPC ............ *H04W 72/12* (2013.01); *H04B 1/713* (2013.01); *H04W 40/24* (2013.01)

(58) Field of Classification Search
None
See application file for complete search history.

(56) References Cited

U.S. PATENT DOCUMENTS

| 9,401,863 | B2 | 7/2016 | Hui et al. | |
|---|---|---|---|---|
| 2013/0250928 | A1* | 9/2013 | Choi | H04W 72/0446 370/337 |
| 2015/0327261 | A1 | 11/2015 | Thubert et al. | |
| 2016/0021596 | A1* | 1/2016 | Hui | H04W 40/04 370/329 |
| 2018/0176853 | A1* | 6/2018 | Chen | H04W 40/246 |

FOREIGN PATENT DOCUMENTS

EP    3266248 A1    1/2018

OTHER PUBLICATIONS

Boubekeur, et al., "Bounding Degrees on RPL", Q2SWinet'15, Nov. 2-6, 2015, Cancun, Mexico., 2015, 8 pages, ACM.
Duquennoy, et al., "6TiSCH Autonomous Scheduling Function (ASF)", <draft-duquennoy-6tisch-asf-01>, 6TiSCH—Internet-Draft, Mar. 1, 2018, 9 pages, IETF Trust.

(Continued)

*Primary Examiner* — Ruihua Zhang
(74) *Attorney, Agent, or Firm* — Behmke Innovation Group LLC; Kenneth J. Heywood; James J. Wong

(57) ABSTRACT

In one embodiment, a device receives data indicative of a routing topology of a network. The network includes a root node and each node in the network has an associated network depth relative to the root node in the routing topology. The device assigns the nodes in the network to timeslots of a channel-hopping communication schedule in order of their associated network depths. The device assigns transmit and receive actions to the timeslots of the communication schedule for a particular time such that parent-to-child and child-to-parent communications alternate with network depth in the timeslots. The device sends the communication schedule with the node and action assignments to one or more of the nodes in the network.

20 Claims, 15 Drawing Sheets

(56) References Cited

OTHER PUBLICATIONS

Pavkovic, et al., "Efficient Topology Construction for RPL over IEEE 802.15.4 in Wireless Sensor Networks", Ad Hoc Networks, vol. 15, Apr. 2014, pp. 25-38, 2014, Elsevier B.V.
Pavkovic, Bogdan., "Going towards the future Internet of Things through a cross-layer optimization of the standard protocol suite", Networking and Internet Architecture [cs.NI], Institut National Polytechnique de Grenoble—INPG, 2012, 156 pages, Université de Grenoble.
Suhonen, Jukka., "Designs for the Quality of Service Support in Low-Energy Wireless Sensor Network Protocols", Thesis for the degree of Doctor of Science in Technology, Publication 1061, 2012, 125 pages, Tampere University of Technology.

\* cited by examiner

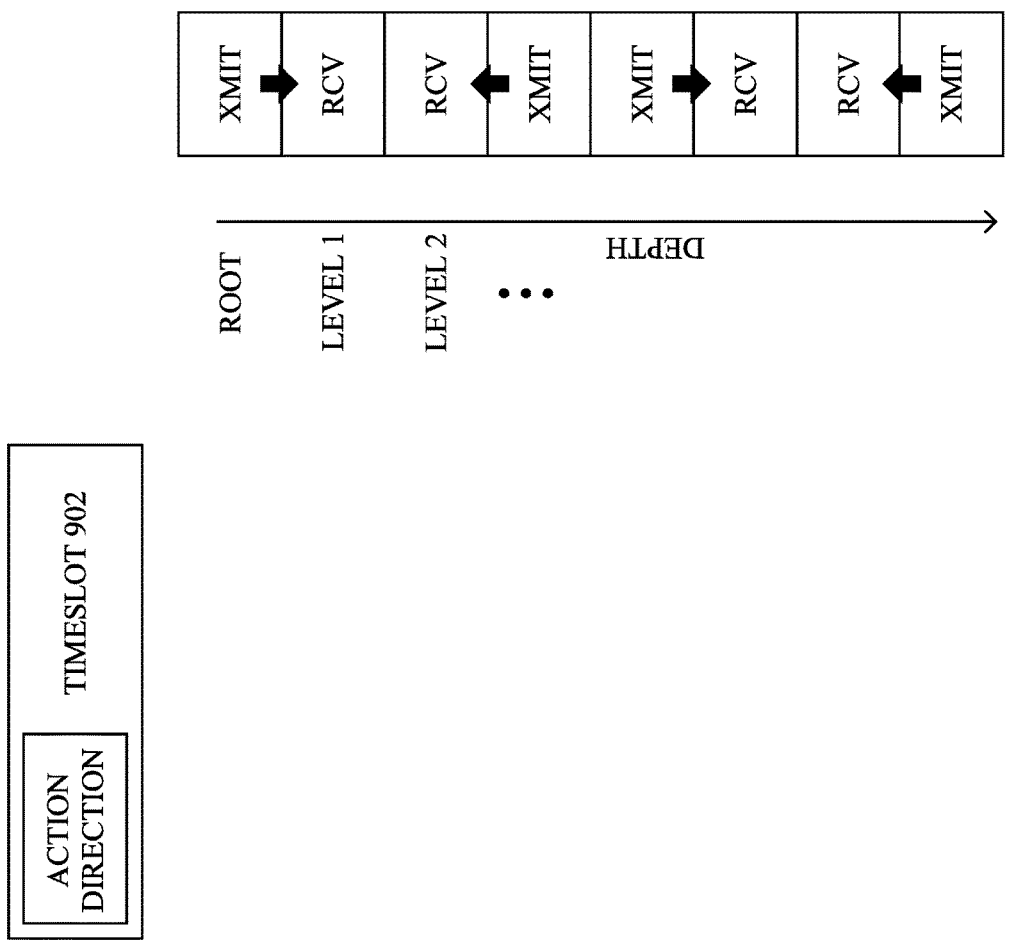

VERTICAL COLLISION AVOIDANCE IN LLNS

TECHNICAL FIELD

The present disclosure relates generally to computer networks, and, more particularly, to avoiding vertical collisions in Low-power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

Channel hopping is a communication mechanism often employed in LLNs that entails varying channel between transmissions in a pseudo random fashion, to benefit from multiple channels in parallel and improve throughput. In general, channel hopping uses a pseudo-random sequence known to both transmitter and receiver. Compared with fixed frequency transmissions, channel hopping reduces the impact of loss on a particular channel due to uncontrolled external interference or multipath fading on that particular channel.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9B illustrate examples of alternating parent-to-child and child-to-parent communications in a communication schedule based on network depth;

DESCRIPTION OF EXAMPLE EMBODIMENTS

Overview

Figure 1:
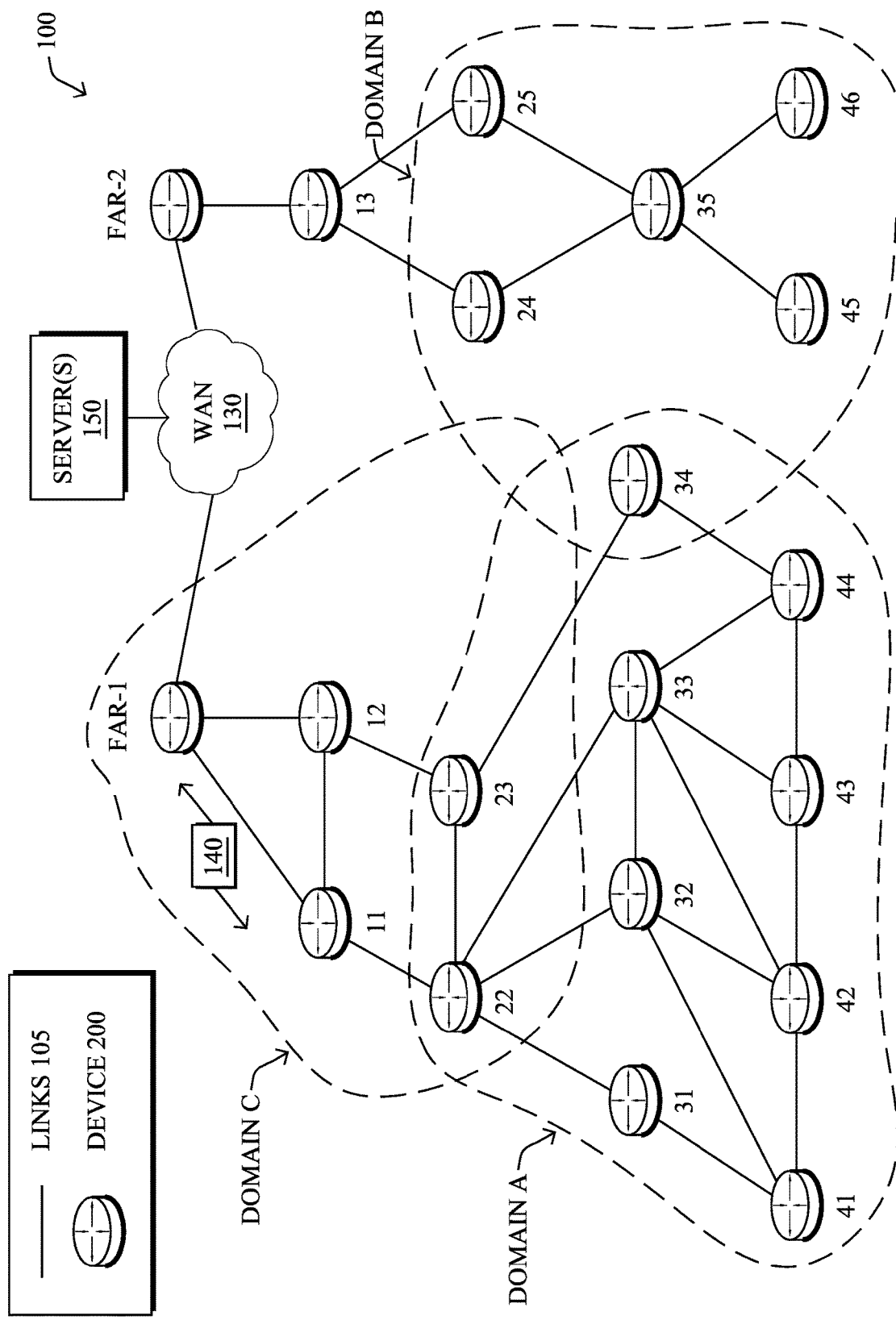
FIG. 1 illustrates an example communication network.

According to one or more embodiments of the disclosure, a device receives data indicative of a routing topology of a network. The network comprises a root node and each node in the network has an associated network depth relative to the root node in the routing topology. The device assigns the nodes in the network to timeslots of a channel-hopping communication schedule in order of their associated network depths. The device assigns transmit and receive actions to the timeslots of the communication schedule for a particular time such that parent-to-child and child-to-parent communications alternate with network depth in the timeslots. The device sends the communication schedule with the node and action assignments to one or more of the nodes in the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
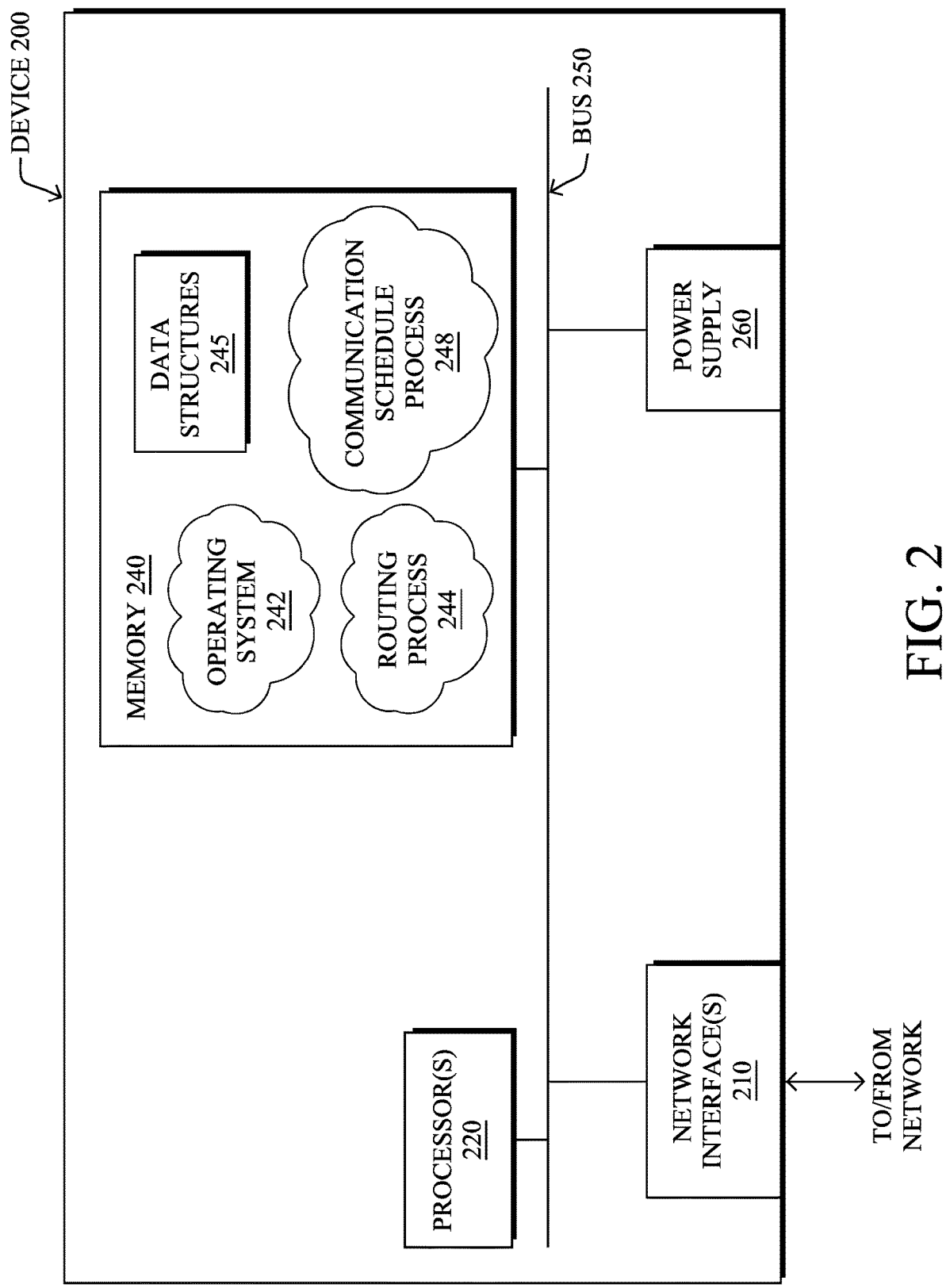
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative communication schedule process 248 as described in greater detail below. Note that while processes 244,248 are shown in centralized memory 240, alternative embodiments provide for either or both of processes 244,248 to be operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/ forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low-power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a timeslot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multi-point-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
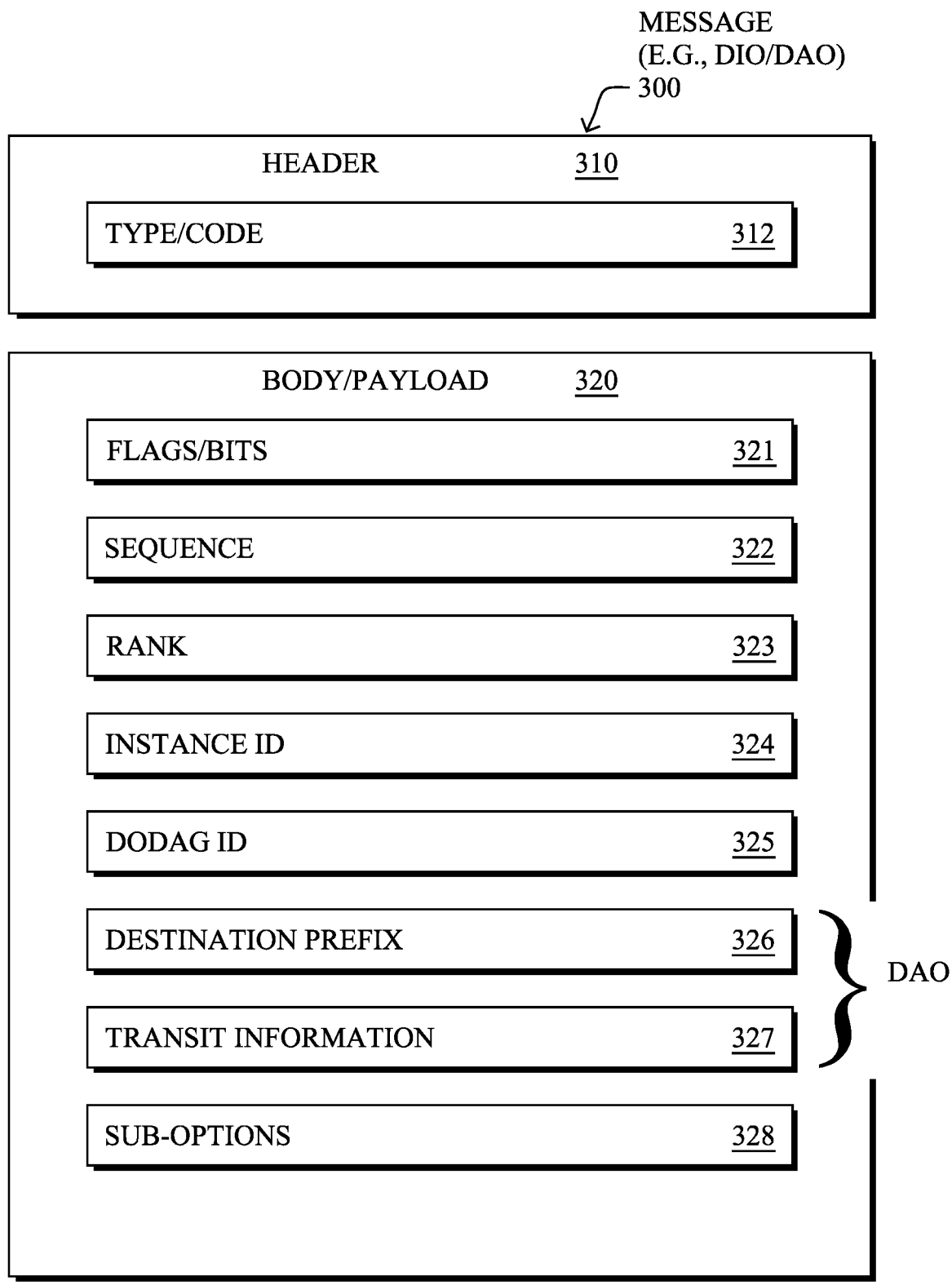
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
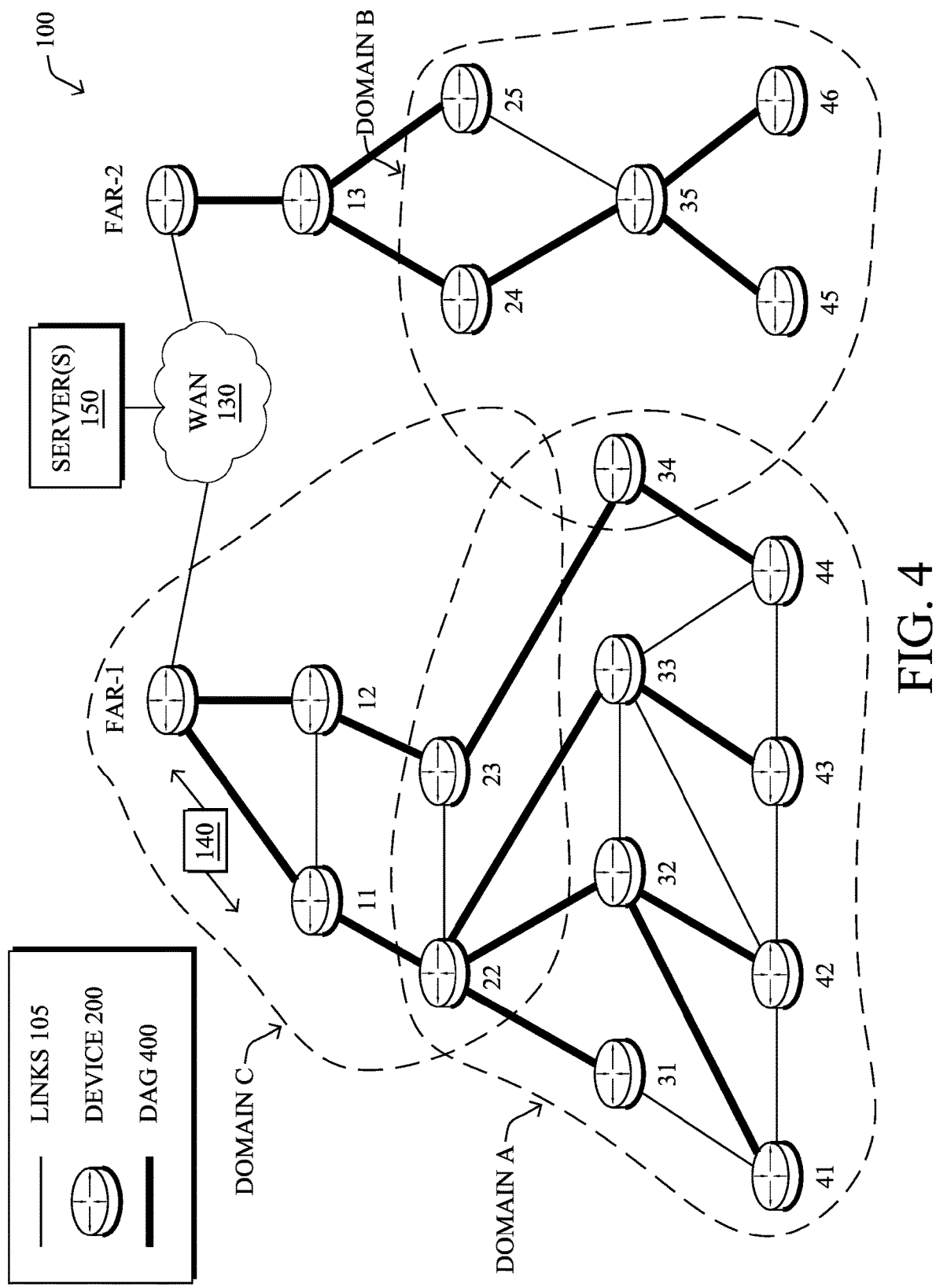
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled media access control (MAC) protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and timeslots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute timeslots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough timeslots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on timeslotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The timeslotted aspect of the TSCH technology is a time division multiplexing (TDM) technique, which requires all nodes in the network to be time synchronized. In other words, time is sliced up into timeslots with a given timeslot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and timeslots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
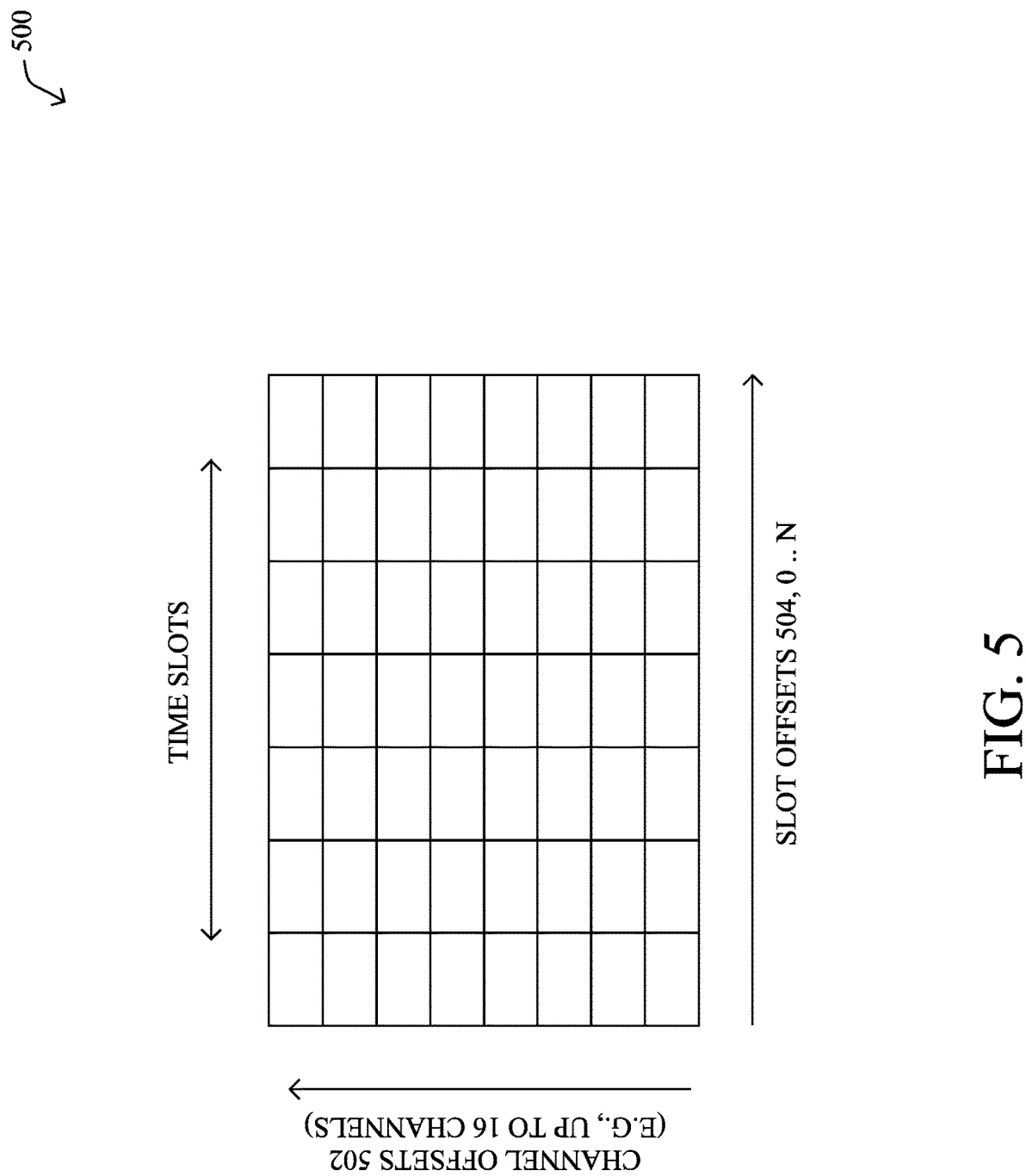
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of timeslots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing timeslots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of timeslots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
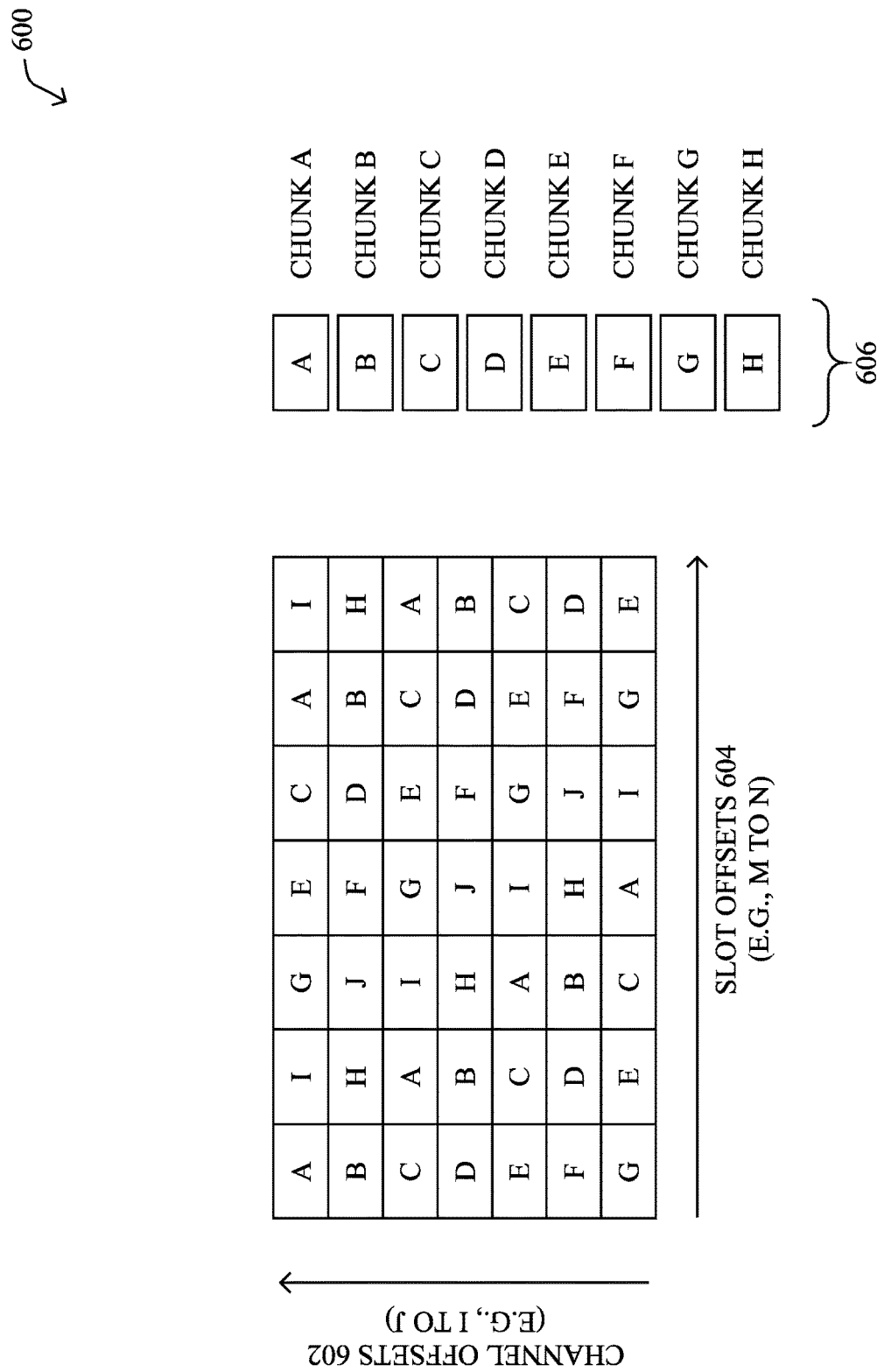
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
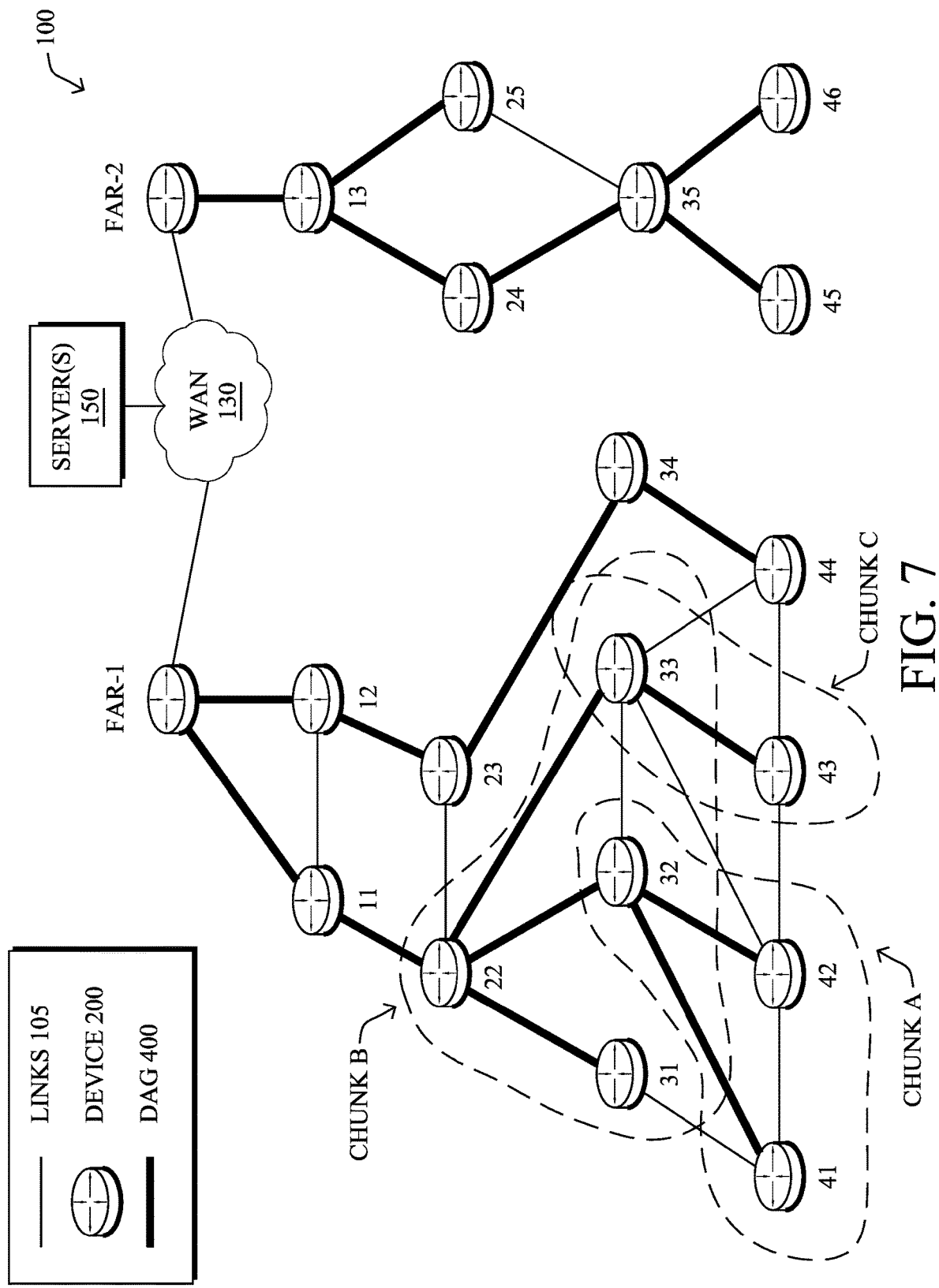
FIGS. 7-8 illustrate examples of a parent node in the network of FIG. 1 scheduling communications for a particular chunk.
Figure 8:
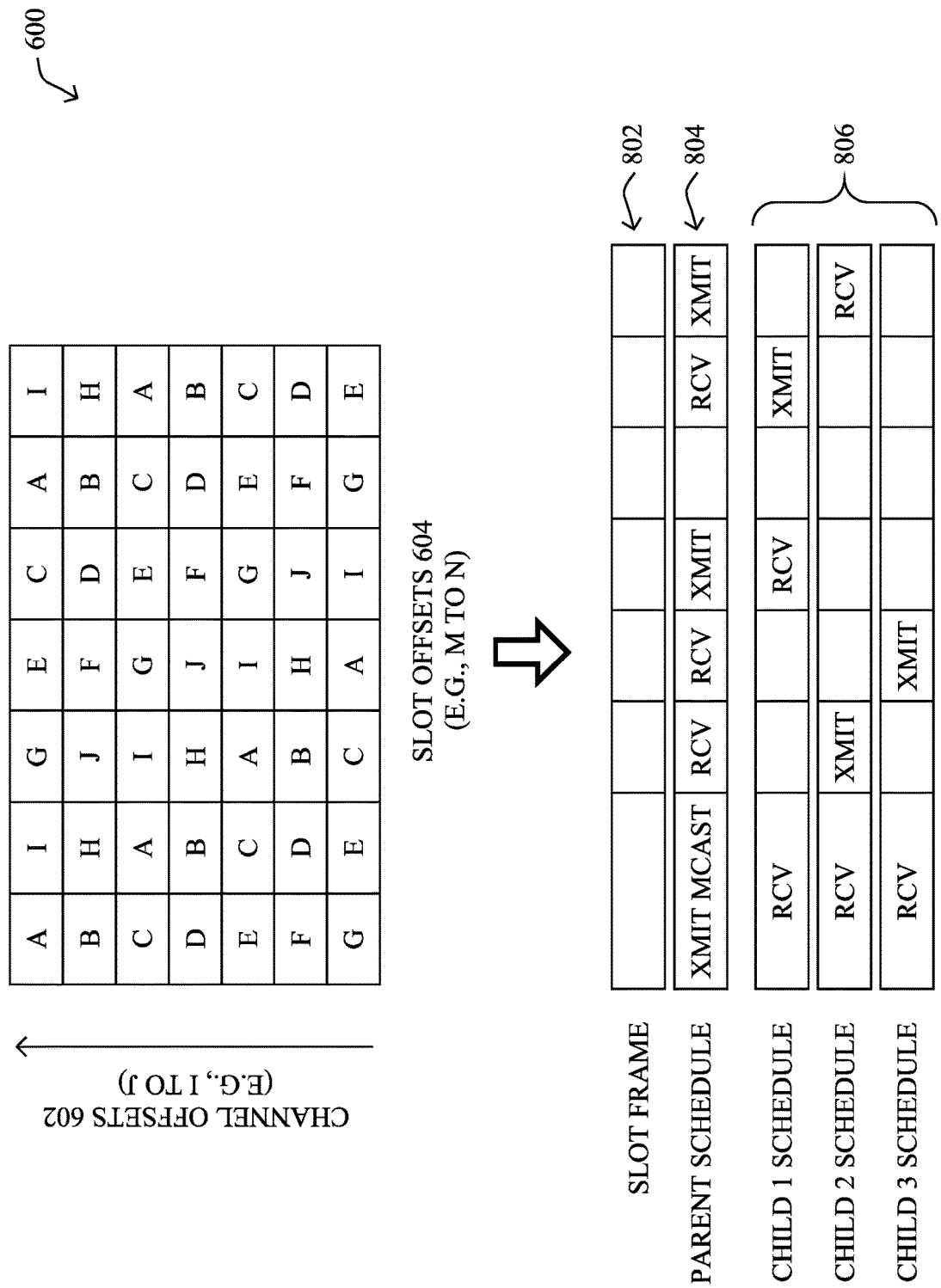

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of timeslots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given timeslot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The timeslots in the slot frame may also be indexed by the slot offsets 604 (e.g., the first timeslot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the timeslots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of timeslots, with a particular timeslot belonging to at most one track. In this model, a set of input cells (timeslots) are uniquely bound to a set of output cells, representing a forwarding state that can be used regardless of the upper layer protocol. In other words, a 6TiSCH track may represent a given path in a network, with the successive cells/timeslots of the track representing the send and receive times of the nodes along the path. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, channel hopping is a communication mechanism often employed in LLNs that entails varying channels between transmissions in a pseudo random fashion, to benefit from multiple channels in parallel and improve throughput. In general, channel hopping uses a pseudo-random sequence known to both transmitter and receiver. Compared with fixed frequency transmissions, channel hopping reduces the impact of loss on a particular channel due to uncontrolled external interference or multipath fading on that particular channel.

The current 6TiSCH and Wi-SUN standards use channel hopping, to avoid collisions. This mechanism is efficient when few nodes transmit at the same time. However, packet losses can still occur in the following situations:

1.) Interference (e.g., including the case of the destination transmitting at the same time, multiple transmissions to this node, hidden terminal issues, etc.).

2.) Excessive number of transmitters at a same time which causes collisions, even if the Wi-SUN channel distribution perfectly randomizes which channel is used by each transmission.

3.) Classical congestion loss (e.g., a node has more outstanding packets than there is bandwidth available).

Of these, interference can often be attributed to the communication schedule itself. For example, the frequency hopping techniques found in Wi-SUN and 6TiSCH are not necessarily efficient enough for purely random/stochastic traffic. Even if the channel selection for a given transmission is perfectly randomized versus other transmissions that occur at the same time, interference that prevents reception of a communication can still happen when a node needs to transmit and receive at the same time. Notably, most nodes in a typical LLN use half-duplex radios meaning that transmission by one node could interfere with reception, even on a different channel. Hidden terminal issues can also lead to interference whereby transmissions from the other side of a receiver interfere with the reception, but were not detected by the sender in its listen-before-talk operation. For example, this occurs in Wi-SUN networks because Wi-SUN randomizes the channel selection based on the destination MAC only. So, if a parent and a child of the node need to transmit a packet to the node at the same time, they will select the same channel, but may not be able to detect one another, leading to a collision during reception.

Vertical Collision Avoidance in LLNs

The techniques herein propose avoiding collisions in a shared media network, such as an LLN, by imposing action patterns on the communication schedule based on the network depths of the nodes in the routing topology. For example, in an RPL-routed network, a transmit action, receive action, or even no action, may be assigned to a given timeslot in the communication schedule based on the depth of the node assigned to the timeslot in the RPL-computed DODAG. In some aspects, the techniques herein can ensure that a node cannot be transmitting at a time another node is also sending to it. The techniques herein can also prevent hidden terminal issues whereby another transmission from a far node could interfere with reception by a given node.

Specifically, according to one or more embodiments of the disclosure as described in detail below, a device receives data indicative of a routing topology of a network. The network comprises a root node and each node in the network has an associated network depth relative to the root node in the routing topology. The device assigns the nodes in the network to timeslots of a channel-hopping communication schedule in order of their associated network depths. The device assigns transmit and receive actions to the timeslots of the communication schedule for a particular time such that parent-to-child and child-to-parent communications alternate with network depth in the timeslots. The device sends the communication schedule with the node and action assignments to one or more of the nodes in the network.

Illustratively, the techniques described herein may be performed by hardware, software, and/or firmware, such as in accordance with the communication schedule process 248, which may include computer executable instructions executed by the processor 220 (or independent processor of interfaces 210) to perform functions relating to the techniques described herein, e.g., in conjunction with routing process 244.

Operationally, a key aspect of the techniques herein is leveraging the network depth of a given node in the routing topology to ensure that the node cannot be transmitting at the same time that another node is sending a communication to it. In various embodiments, this can be achieved by computing a channel-hopping communication schedule that includes transmission and reception slots that alternate with network depth, since packets are typically sent to an increasing or decreasing depth. For example, in the case of an RPL-based network, communications may be categorized as either 'up' (e.g., towards the root node) or 'down' (e.g., away from the root node). In other words, communications may either be parent-to-child or child-to-parent, according to the RPL-computed DAG.

Figure 9A:
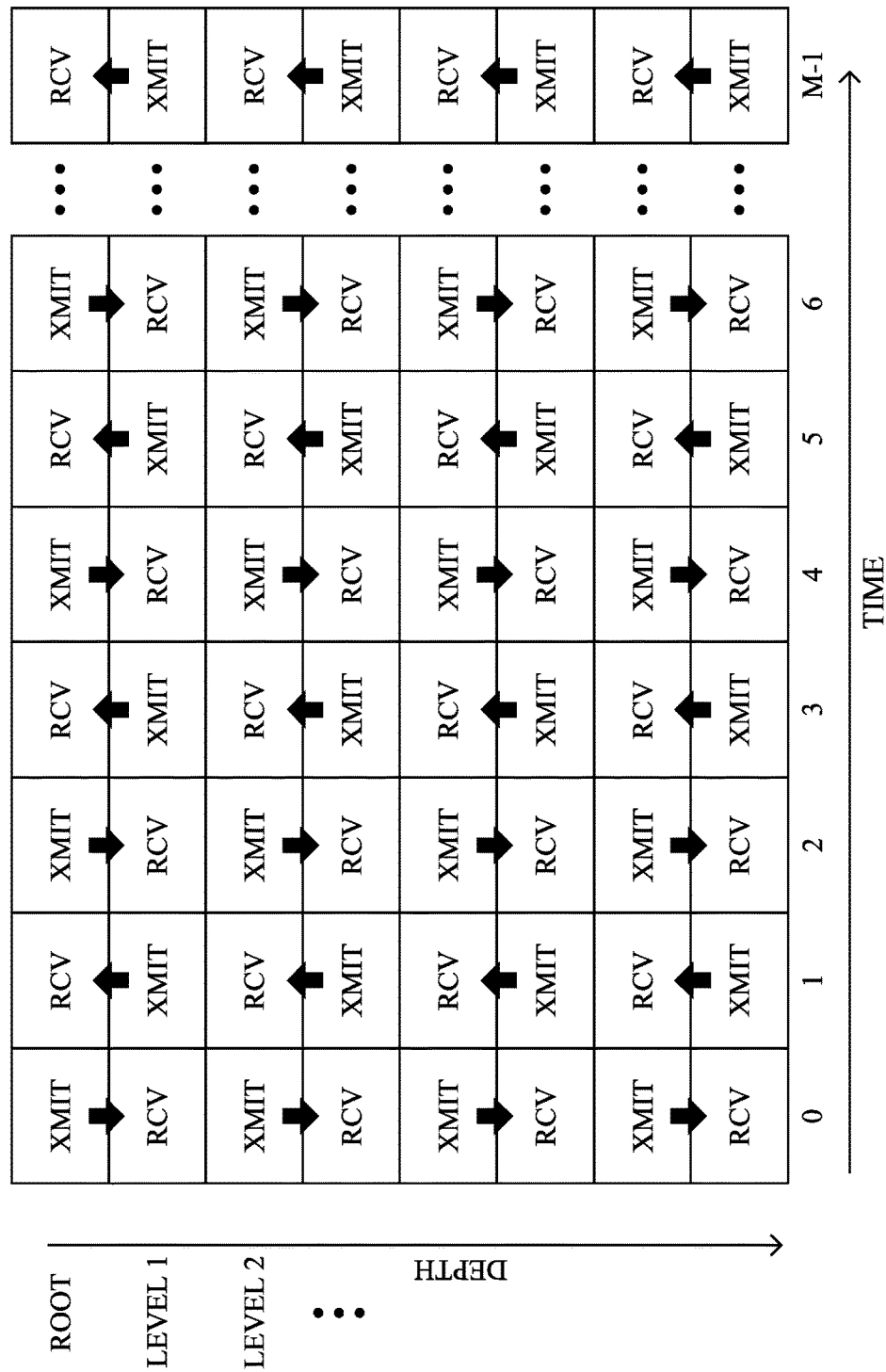

FIG. 9A illustrates an example communication schedule 900, according to various embodiments. As shown, communication schedule 900 may comprise M-number of timeslots 902 (e.g., ranging from index '0' to 'M−1'). In various embodiments, each timeslot 902 may be assigned to nodes in the network according to their depth in the routing topology. For example, the first row of timeslots 902 in communication schedule 900 may be assigned to the root node of the network, the second row of timeslots 902 assigned to a child node of the root (e.g., at Level 1, which is one hop from the root), etc. Also as shown, timeslots 902 may have an assigned action, such as transmit (denoted 'xmit') or receive (denoted 'rcv'), with the associated direction of the action denoting whether the node is to transmit or receive to or from its parent or child. In other words, four possibilities exist for a given timeslot 902: a node may receive from its parent, the node may transmit to its parent, the node may receive from its child, or the node may transmit to its child.

In a trivial implementation of the techniques herein, communication schedule 900 alternates between parent-to-child and child-to-parent communications, at any given time. In other words, for any given time, all communications are either parent-to-child or child-to-parent. As a result of these assignments, communication schedule 900 avoids the collision case of a node transmitting at the same time as it is receiving. However, this simplistic approach is still susceptible to hidden terminal issues. Notably, hidden terminal issues occur when a receiver is within the range of two separate transmitters, such as one at a higher network depth and another at a lower network depth.

FIG. 9B illustrates a modified approach to forming a communication schedule that utilizes the above methodology, but also takes into account hidden terminal issues. As shown, consider the set 904 of timeslots 902 for a given time in the communication schedule. Similar to the case in FIG. 9A, timeslots 902 in set 904 may be assigned to nodes in the network in order of their network depth in the routing topology.

In various embodiments, action assignments to timeslots 902 in set 904 can also be made such that parent-to-child and child-to-parent communications alternate with the network depth. In other words, up and down transmissions can be assigned to set 904, in order to add an extra hop between a given node and another transmitter that is not sending to that node. Thus, when facing a same type of action (e.g., transmit or receive) the timeslots 904 are oriented the other way. This limits interference attributable to hidden terminals, since a receiving node is only one hop away from its transmitting node and two hops away from any potential interferer.

Figure 10A:
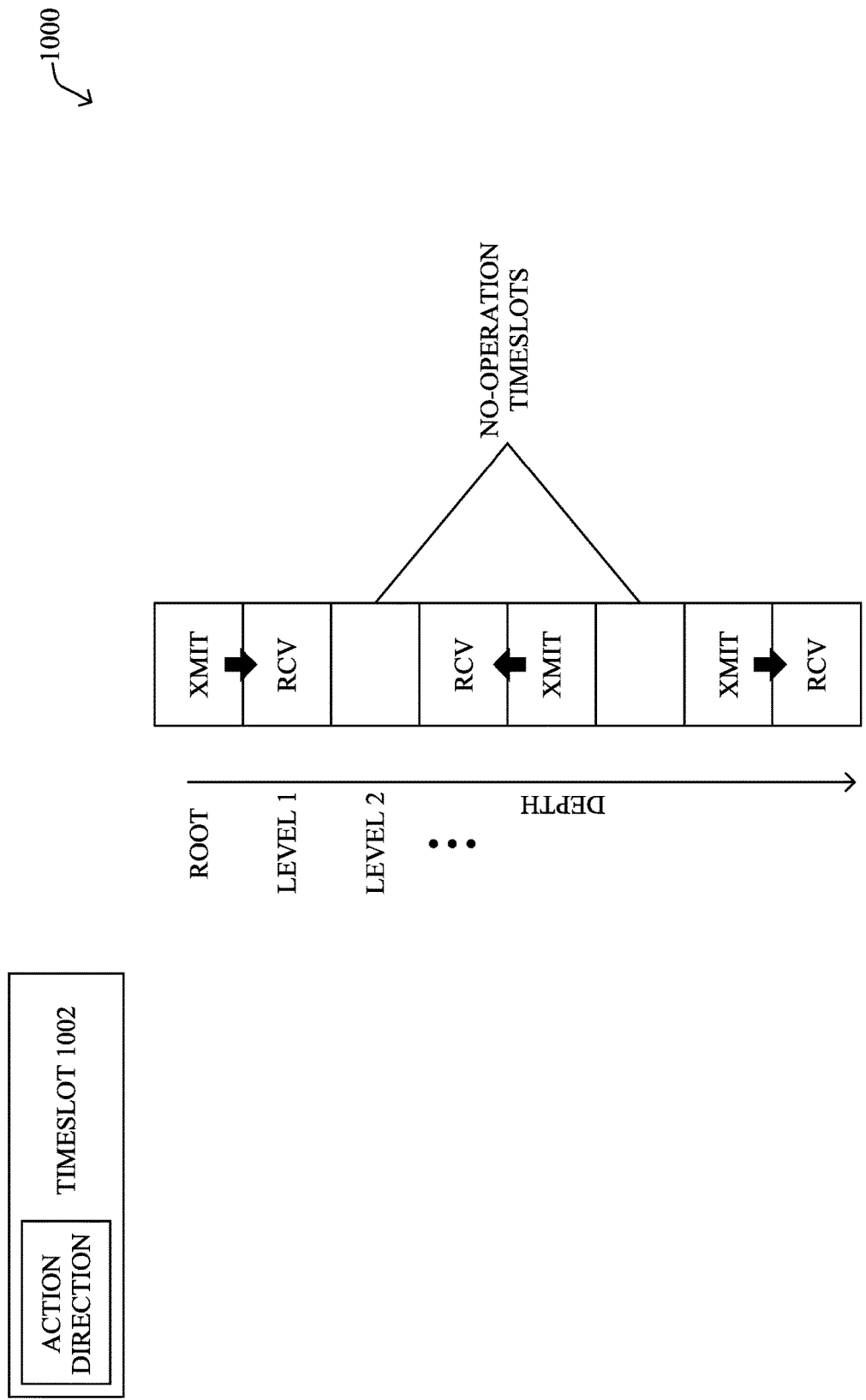
FIGS. 10A-10C illustrate examples of interleaving no actions in a communication schedule.
Figure 10B:
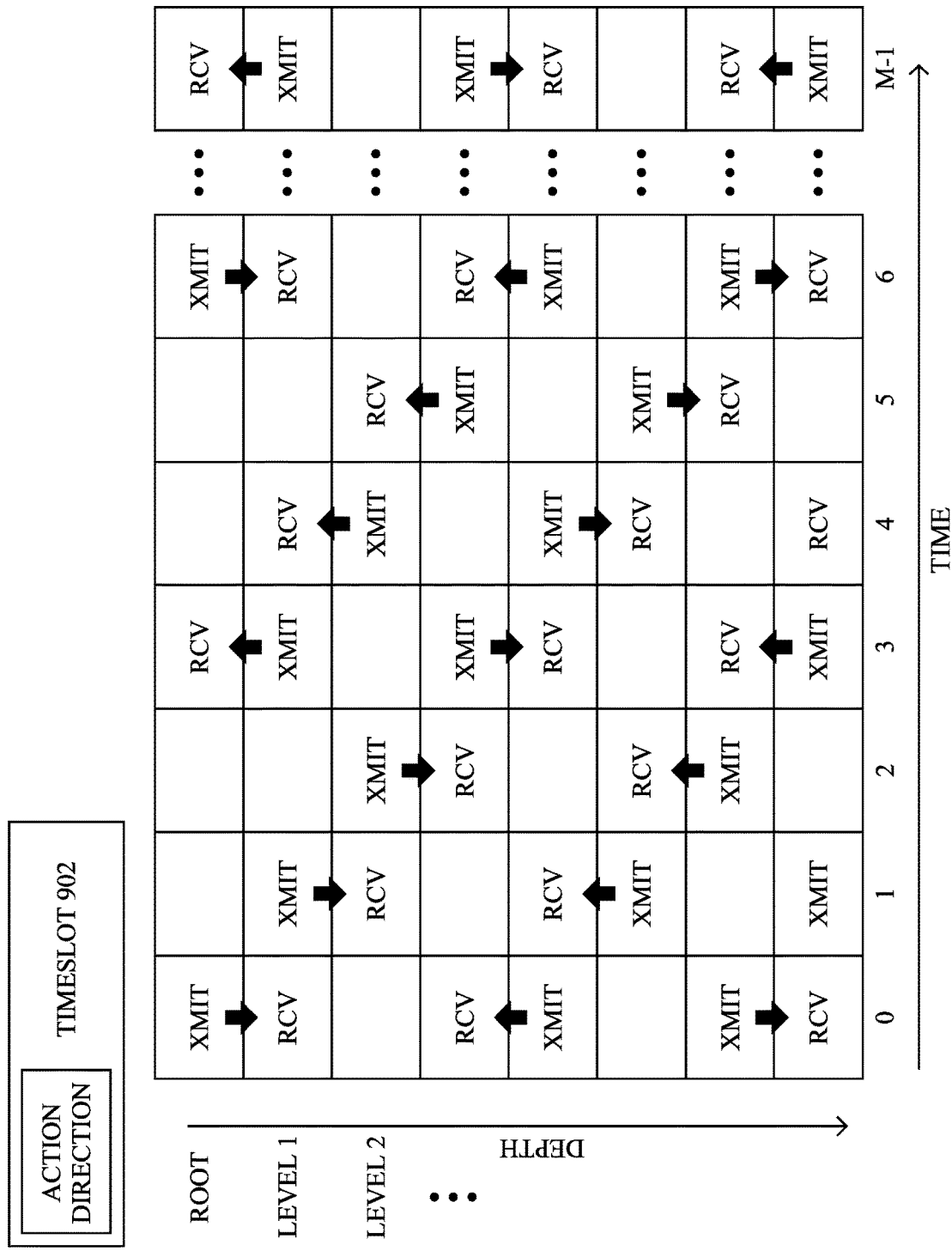
Figure 10C:
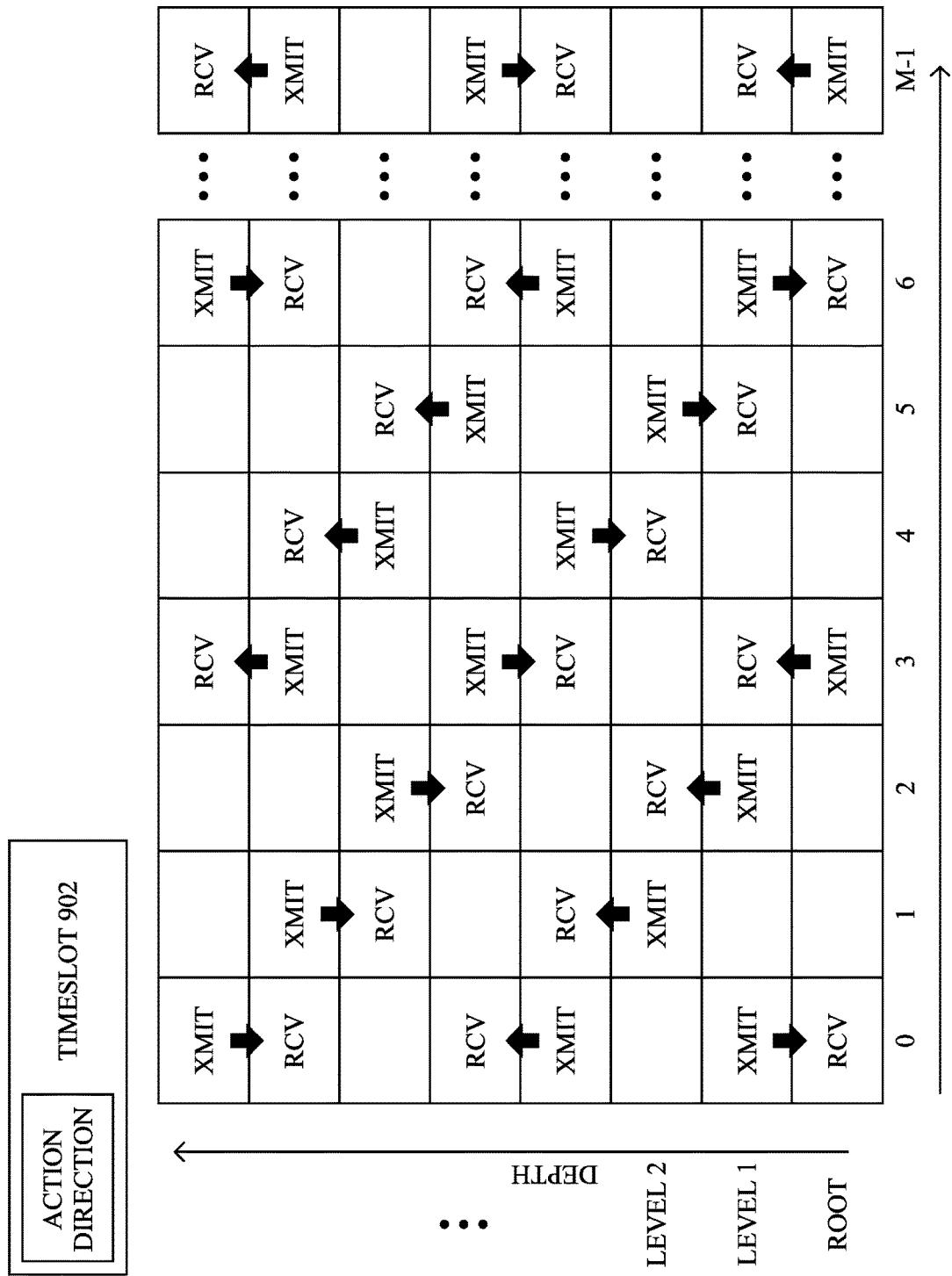

In further embodiments, additional separation can be achieved between transmitting nodes by assigning "no operation" as the action for certain timeslots. FIGS. 10A-10C illustrate examples of the techniques herein with the assignment of "no operation" timeslots. In general, a node that has been assigned a no-operation timeslot is to neither receive nor transmit during that time. In some cases, the radio of the node can be shut down during this time, to conserve energy. This power savings can be particularly significant for LLN devices that have limited energy resources, such as being battery-powered. Accordingly, a no-operation timeslot can also correspond to a "power down" timeslot, in some cases.

FIG. 10A illustrates a set 1000 of timeslots 902 in which some of the timeslots are assigned no operation actions. As shown, nodes in the network may be assigned to the timeslots 902 in set 1000 for a particular time, according to their network depth in the routing topology, similar to the above examples. Also similar to the example of FIG. 9B, downward and upward communications may be assigned in set 1000 in an alternating manner as the network depth increases. For example, if an upward transmission is assigned at one depth in set 1000, the next transmission deeper in the routing topology that occurs at the same time may be a downward transmission.

By inserting a no-operation timeslot between parent-to-child and child-to-parent communication assignments, this provides even greater separation between a given receiver node and transmitter nodes that are not its intended transmitter. In doing so, the potential for interference due to hidden terminals is even further reduced. Further, since parent-to-child and child-to-parent communications are alternated along the routing path at the same time, no node is transmitting at the same time another node is transmitting to it.

The interleaving of no-operation timeslots and alternating of communication directions along the network depth, as described above, can be used to form communication schedules that are optimized for downward or upward communications. For example, FIG. 10B illustrates an example communication schedule 1004 comprising a plurality of timeslots 902. As shown, the node in the network may be assigned to timeslots 902 of communication schedule 1004 according to their network depth. In keeping with the teaching above, for any given time, transmission and reception actions can be assigned to the timeslots 902 of communication schedule 1004 such that parent-to-child and child-to-parent transmission alternate with increasing network depth in the routing topology. In addition, no-operation timeslots may be interspersed between these communications, to provide an additional buffer and reduce interference due to hidden terminal issues.

Communication schedule 1004 is particular optimized for the distribution of packets away from the root node towards the other nodes in the network. For example, communication schedule 1004 may be well suited for sending multicast or broadcast messages from the root node into the network. Notably, if a node is assigned a receive timeslot 902 at a given time, it may be assigned a transmit timeslot 902 right afterwards. In doing so, schedule 1004 includes timeslot assignments such that schedule 1004 can support a chain of transmissions that propagate from one level to the next across a contiguous set of timeslots 902 in time and away from the root.

FIG. 10C illustrates a communication schedule 1006 that is optimized for data collection by the root node, in further embodiments. In the example shown, timeslots 902 are again assigned to nodes in order of their network depth in the network topology, parent-to-child and child-to-parent communications are scheduled in an alternating manner along the depth for any given time, and no-operation timeslots used to separate these communications at that time. In schedule 1006, there are timeslot assignments such that communications can be propagated level-by-level towards the root node using a contiguous set of timeslots 902.

Any variation or combination of the approaches illustrated in FIGS. 10B-10C is possible, depending on the type of traffic. For example, communication schedules 1004 and 1006 can be interleaved or used one after the other.

In a further embodiment, the techniques herein can be used to control the ratio of transmit nodes that a node can use based on its network depth in the routing topology. For example, the ratio of transmit nodes can be controlled such that point to multipoint (P2MP) and multipoint to point (MP2P) traffic concentrates near the root node in the communication schedule. An example of this is illustrated in communication schedule 1100 in FIG. 11.

Figure 11:
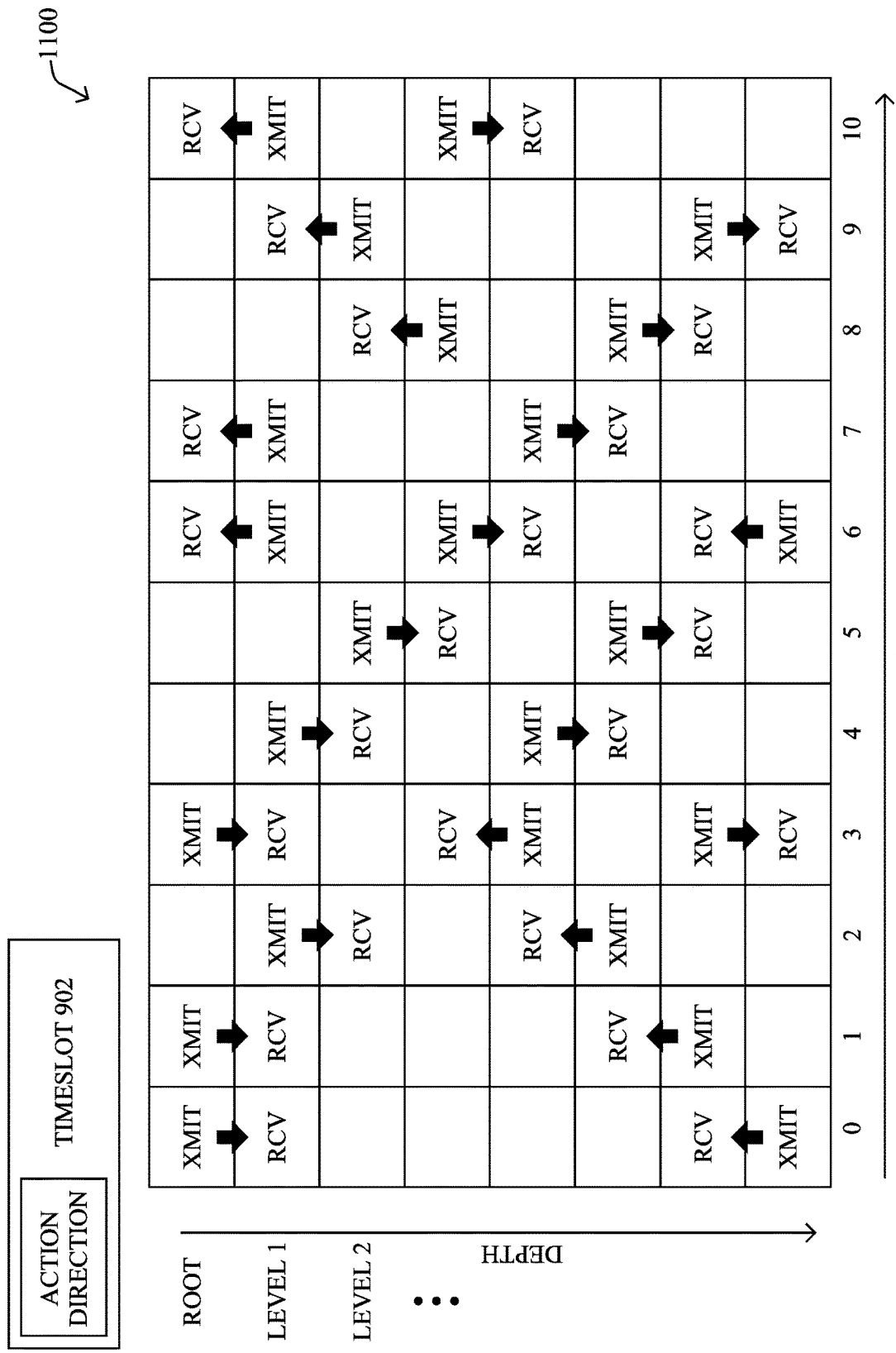
FIG. 11 illustrates an example communication schedule optimized for both downward and upward communications in the network.

As shown in FIG. 11, communication schedule 1100 again assigns nodes to timeslots in order of their network depth, parent-to-child and child-to-parent communications are alternated along the network depth for any given time, and at least one no-operation timeslot 902 in which no action is taken is assigned between the parent-to-child and child-to-parent communications at that time. In addition, the ratio of transmit timeslots 902 for a given node is controlled by assigning additional no-operation/no-action timeslots to nodes that are farther away from the root node in the routing topology.

By inserting additional silent timeslots away from the root, this allows communication schedule 1100 to:
  balance traffic flows both directions (e.g., at least one packets makes it through all the way in both directions) and
  favor communications near the root (e.g., the first column of communication schedule 1100 serves one hop deep, the second and third columns serve two hops deep, and the sequence from the fourth goes all the way down).

Figure 12:
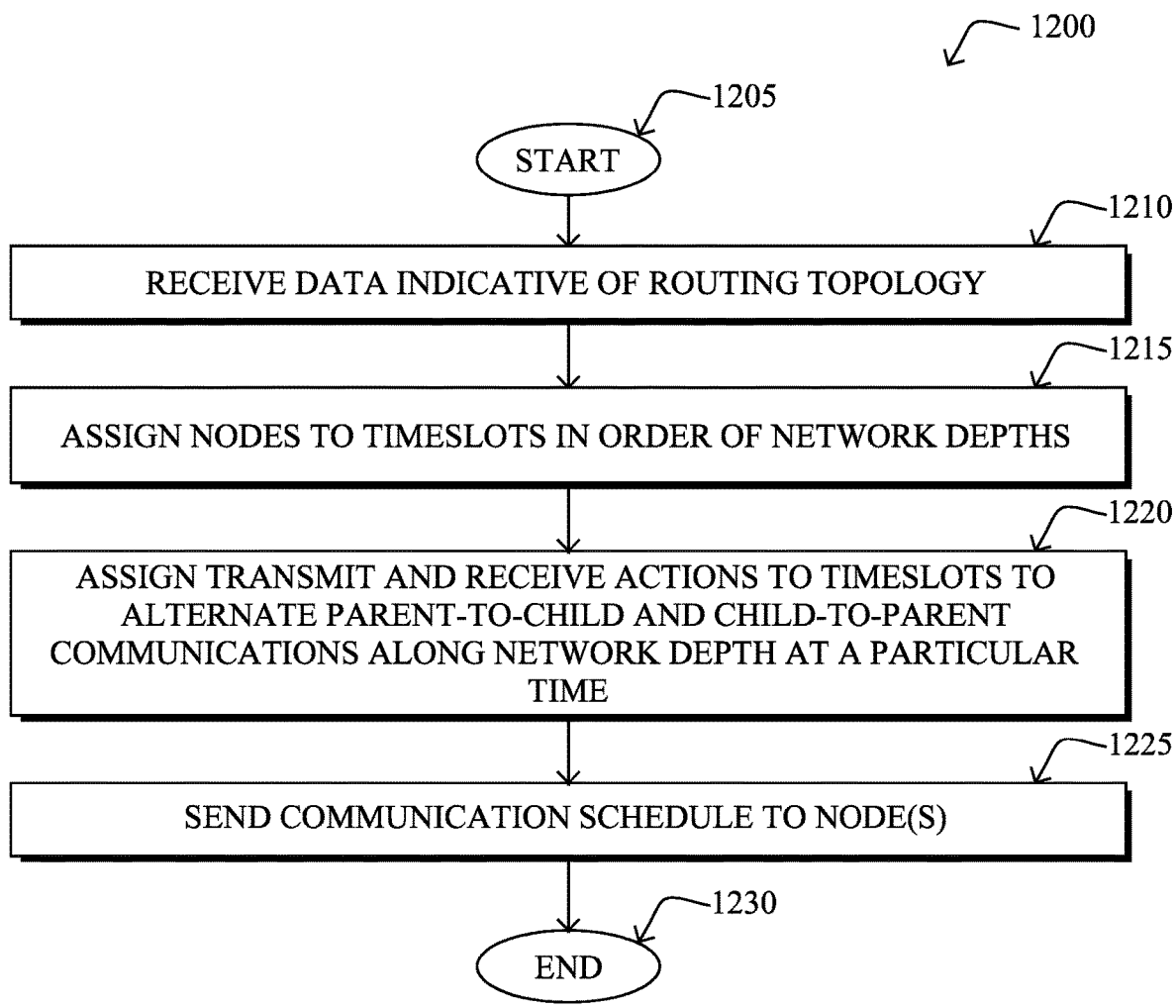
FIG. 12 illustrates an example simplified procedure for scheduling network communications to avoid vertical collisions.

FIG. 12 illustrates an example simplified procedure for scheduling network communications to avoid vertical collisions in a network, in accordance with one or more embodiments described herein. For example, a non-generic, specifically configured device (e.g., device 200), such as an NMS or other supervisory device in a network, may perform procedure 1200 by executing stored instructions (e.g., process 248). The procedure 1200 may start at step 1205, and continues to step 1210, where, as described in greater detail above, the device may receive data indicative of a routing topology of a network. In various embodiments, the network comprises a root node and each node in the network has an associated network depth relative to the root node in the routing topology. For example, the network may be an RPL-routed LLN. In such a case, the routing topology may be a (DO)DAG rooted at a root node.

At step 1215, as detailed above, the device may assign the nodes in the network to timeslots of a channel-hopping communication schedule in order of their associated network depths. For example, in the case of an RPL network, the network depth of a node may represent the number of hops between the node and the root of the network, according to the RPL-created DAG.

At step 1220, the device may assign transmit and receive actions to the timeslots of the communication schedule for a particular time such that parent-to-child and child-to-parent communications alternate with network depth in the timeslots, as described in greater detail above. For example, if a particular timeslot for a node is assigned a downward transmit action (e.g., to its child node in the topology), the next transmit timeslot in order of network depth may be an upward transmit timeslot, at that same time. Conversely, if a child-to-parent communication is assigned to the timeslots of one parent-child pair of nodes at a given time, the next scheduled communication in order of network depth for that time may be a parent-to-child communication. In further embodiments, no action may be assigned to certain timeslots in between the parent-to-child and child-to-parent communications, to provide a larger buffer between a receiver node and other transmitter nodes that are not its corresponding parent or child transmitter. Doing so also helps to avoid hidden terminal interference, in addition to avoiding vertical collisions.

At step 1225, as detailed above, the device may send the communication schedule with the node and action assignments to one or more of the nodes in the network. In turn, the receiving node(s) may communicate with their parents and/or children, in accordance with the communication schedule. Procedure 1200 then ends at step 1230.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce channel hopping schedule methodologies that avoid collisions by imposing patterns based on the depths of the nodes in the routing topology. Notably, the techniques herein ensure that a node cannot be transmitting at a time at which another node is also transmitting to it. In further aspects, a communication schedule can be formed such that transmission and receiving timeslots are separated and interleaved. Doing so results in parent-to-child and child-to-parent communications at a given time being scheduled in an alternating fashion along the routing paths (e.g., with increasing or decreasing network depth, relative to the root node). In another aspect, transmitting and receiving nodes can be paired in the communication schedule (e.g., pairs of parent and child nodes, according to the routing topology) and their transmissions oriented either up or down in the network (e.g., towards or away from the root). In yet another aspect, the techniques herein can also be used to assign no action/no operation slots to the communication schedule, to separate facing receive and facing transmit slots, to further reduce the chance of hidden terminal interference. In another aspect, the techniques herein can be used to control the ratio of transmit timeslots that a node can use, based on its network depth in the routing topology, to concentrate certain traffic (e.g., MP2P and P2MP traffic) closer to the root.

While there have been shown and described illustrative embodiments that provide for scheduling communications in LLNs and other networks to avoid vertical collisions, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, such as RPL and 6TiSCH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a device, data indicative of a routing topology of a network, wherein the network comprises a root node and each node in the network has an associated network depth relative to the root node in the routing topology;
    assigning, by the device, the nodes in the network to timeslots of a channel-hopping communication schedule in order of their associated network depths;
    assigning, by the device and for a particular time in the channel-hopping communication schedule, transmit and receive actions to a set of timeslots of the communication schedule for the particular time such that parent-to-child communications and child-to-parent communications alternate with network depth in the timeslots, wherein the parent-to-child communications are downward and the child-to-parent communications are upward; and sending, by the device, the communication schedule with the node and action assignments to one or more of the nodes in the network.

2. The method as in claim 1, wherein the routing topology comprises a destination-oriented directed acyclic graph (DODAG) rooted at the root node.

3. The method as in claim 2, wherein the DODAG is computed using the Routing Protocol for Low Power and Lossy Networks (RPL).

4. The method as in claim 1, wherein assigning the transmit and receive actions to the timeslots of the communication schedule for the particular time such that parent-to-child and child-to-parent communications alternate with network depth in the timeslots comprises:

assigning no action to one or more timeslots between the parent-to-child and child-to-parent communications that alternate with network depth in the timeslots for the particular time.

5. The method as in claim 4, further comprising:

assigning, by the device, no action to fewer timeslots associated with the depth of the root node in the communication schedule than to timeslots associated with a particular depth away from the root node.

6. The method as in claim 4, further comprising:

assigning, by the device, transmit, receive, and no actions to the communication schedule, to optimize communications away from the root node.

7. The method as in claim 4, further comprising:

assigning, by the device, transmit, receive, and no actions to the communication schedule to optimize communications towards the root node.

8. The method as in claim 1, wherein the transmit and receive actions are assigned to the timeslots of the communication schedule such that any node in the network cannot transmit when another node in the network is transmitting to it.

9. The method as in claim 1, wherein the communication schedule is a Wireless Smart Utility network (Wi-Sun) or An Architecture for IPv6 over the TSCH mode of IEEE 802.15.4e (6TiSCH) communication schedule.

10. An apparatus, comprising:

one or more network interfaces to communicate with a network;

a processor coupled to the network interfaces and configured to execute one or more processes; and a memory configured to store a process executable by the processor, the process when executed configured to:

receive data indicative of a routing topology of a network, wherein the network comprises a root node and each node in the network has an associated network depth relative to the root node in the routing topology;

assign the nodes in the network to timeslots of a channel-hopping communication schedule in order of their associated network depths;

assign, for a particular time in the channel-hopping communication schedule, transmit and receive actions to a set of timeslots of the communication schedule for the particular time such that parent-to-child communications and child-to-parent communications alternate with network depth in the timeslots, wherein the parent-to-child communications are downward and the child-to-parent communications are upward; and send the communication schedule with the node and action assignments to one or more of the nodes in the network.

11. The apparatus as in claim 10, wherein the routing topology comprises a destination-oriented directed acyclic graph (DODAG) rooted at the root node.

12. The apparatus as in claim 11, wherein the DODAG is computed using the Routing Protocol for Low Power and Lossy Networks (RPL).

13. The apparatus as in claim 10, wherein the apparatus assigns the transmit and receive actions to the timeslots of the communication schedule for the particular time such that parent-to-child and child-to-parent communications alternate with network depth in the timeslots by:

assigning no action to one or more timeslots between the parent-to-child and child-to-parent communications that alternate with network depth in the timeslots for the particular time.

14. The apparatus as in claim 13, wherein the process when executed is further configured to:

assign no action to fewer timeslots associated with the depth of the root node in the communication schedule than to timeslots associated with a particular depth away from the root node.

15. The apparatus as in claim 13, wherein the process when executed is further configured to:

assign transmit, receive, and no actions to the communication schedule, to optimize communications away from the root node.

16. The apparatus as in claim 13, wherein the process when executed is further configured to:

assign transmit, receive, and no actions to the communication schedule to optimize communications towards the root node.

17. The apparatus as in claim 13, wherein no action assigned to a given timeslot causes the node assigned to that timeslot to power down its radio during that timeslot.

18. The apparatus as in claim 10, wherein the communication schedule is Wireless Smart Utility network (Wi-Sun) or An Architecture for IPv6 over the TSCH mode of IEEE 802.15.4e (6TiSCH) communication schedule.

19. A tangible, non-transitory, computer-readable medium storing program instructions that cause a device to execute a process comprising:

receiving, at the device, data indicative of a routing topology of a network, wherein the network comprises a root node and each node in the network has an associated network depth relative to the root node in the routing topology;

assigning, by the device, the nodes in the network to timeslots of a channel-hopping communication schedule in order of their associated network depths;

assigning, by the device and for a particular time in the channel-hopping communication schedule, transmit and receive actions to a set of timeslots of the communication schedule for the particular time such that parent-to-child communications and child-to-parent communications alternate with network depth in the timeslots, wherein the parent-to-child communications are downward and the child-to-parent communications are upward; and sending, by the device, the communication schedule with the node and action assignments to one or more of the nodes in the network.

20. The computer-readable medium as in claim 19, wherein the communication schedule is Wireless Smart Utility network (Wi-Sun) or An Architecture for IPv6 over the TSCH mode of IEEE 802.15.4e (6TiSCH) communication schedule.

* * * * *